Patented Feb. 20, 1934

1,947,671

UNITED STATES PATENT OFFICE 1,947,671

MANUFACTURE OF ALKALI CARBONATE OR ALKALI HYDROXIDE, AND BY-PRODUCTS OF AMMONIA OR AMMONIUM SALTS

Friedrich Bartling, Huglfing, Germany; Jenny Bartling, executrix of said Friedrich Bartling, deceased, assignor to Alterum Kredit-Aktien-Gesellschaft, Berlin, Germany, a company of Germany No Drawing. Application August 13, 1931, Serial No. 556,946, and in Germany August 26, 1930

2 Claims. (Cl. 23—119)

It is known to convert alkali sulphate in the presence of carbonate of lime by the action of carbon and nitrogen at a high temperature, for example 1000° C., into alkali cyanide, cyanamide or the like.

In the conversion of sodium sulphate into sodium cyanide, for example, the process takes place according to the following equation:

$$Na_2SO_4 + 6C + CaCO_3 + N_2 = 2NaCN + CaS + 3CO + 2CO_2.$$

This invention is based on the idea of introducing this known process stage into a process of manufacturing alkali carbonate or alkali hydroxide from alkali sulphate after the manner of the known Leblanc soda process, thereby improving the said process, inasmuch as ammonia is produced as a by-product by saponification of the alkali cyanide. The economy of this process which, as is known, has heretofore been extremely questionable, is thereby very substantially increased.

In this sense, according to the invention, a process of manufacturing alkali carbonate or alkali hydroxide after the manner of the Leblanc soda process with the recovery of ammonia as by-product is characterized in that alkali sulphate in admixture with carbon and if necessary lime is converted by the action of nitrogen at a high temperature into alkali cyanide and the latter is saponified for the purpose of manufacturing alkali carbonate or alkali hydroxide with the recovery of ammonia as by-product.

The particular advantage of the new process as compared with the mode of procedure employed heretofore is rendered evident by the fact that, according to the following equation, ammonia is recovered as a by-product by saponification of, for example, sodium cyanide at, say, 400° to 500° C.:

$$2NaCN + 4H_2O = Na_2CO_3 + CO + H_2 + 2NH_3.$$

It has been found that, whereas heretofore, in the Leblanc soda process, the cooperation of carbonate of lime or caustic lime was regarded as indispensable for the intended conversion, the carbon-nitrogen reaction may also be carried out without the addition of lime.

The above saponification equation shows the manufacture of sodium carbonate. However, it is also possible, for example by a saponification of the solid material, provided the latter is treated spread out in a thin layer, to manufacture directly sodium hydroxide. The reaction then proceeds according to the equation:

$$2NaCN + 4H_2O = 2NaOH + 2CO + 2NH_3.$$

Of course, the same applies for the manufacture of potassium carbonate and potassium hydroxide from potassium sulphate.

Accordingly, the process embraces both the manufacture of alkali carbonates and also of caustic alkalis.

For the production of large quantities of ammonia, it is preferable to convert the alkali carbonates or alkali hydroxides, formed by saponification of the alkali nitrogen compound, into alkali cyanide, cyanamide or the like by repated cyanidation, to resaponify the said alkali cyanide, cyanamide or the like and if necessary to repeat the entire process some few times.

The sulphur compound, for example calcium sulphide, CaS, produced according to the equation given in the foregoing in the preparation of cyanide may directly and advantageously, for example by treatment with carbon dioxide and water under suitable conditions, be converted into carbonate, which is preferably reintroduced into the cyanidation process, and hydrogen sulphide. The decomposition of hydrogen sulphide with oxygen, preferably in the presence of catalysts, yields in the known manner with $H_2O$ sulphuric acid. On working up in such a manner the sulphur contained in the raw material, alkali sulphate, into sulphuric acid and on saponification of the cyanide, cyanamide or the like, whereby ammonia is formed, ammonium sulphate may be recovered advantageously as a valuable fertilizer by a known process. On the other hand, of course, it is not necessary to work up the two products ammonia and sulphuric acid into ammonium sulphate, but they may evidently be sold separately, each in itself being a raw product which is very much in demand in the large-scale chemical industry.

As a carbonaceous reagent in the cyanidation stage, both coke and coal may be used to advantage. Coke is more particularly useful because it presents the carbon in a particularly highly active form, while on the other hand coal, especially raw coal, is distinguished for its cheapness, and the recovery of its useful and valuable by-products may readily be combined with the main process. Further, on using coal or coke as carbon carrier, a utilization of the sulphur, often contained in the coal in utilizable quantities, may be combined with the process according to the invention. It will be seen at once that there is then a certain additional production of sulphuric acid, the recovery of which results from the course of the process without appreciably increased outlay.

The industrial significance of the process according to the invention appears above all from the fact that from a cheap raw material, as is alkali sulphate, several very valuable marketable products are produced directly in comparatively simple process stages.

*Example I*

The following example gives individually the quantities of substances used in carrying out the process according to the invention for the manufacture of 10 tons of caustic soda.

For making a suitable mixture for the cyanidation, about 18 tons of sodium sulphate, 22 tons of coal and 19 tons of lime are used. The saponification with steam subsequent to the cyanidation of this mixture yields 10 tons of caustic soda of 98% purity. In addition, 3,457 kilograms of ammonia are produced on saponification. The sulphur constituent of the sodium sulphate is recovered in the form of sulphuric acid in an amount of about 10 tons. The decomposition of the sulphuric acid with ammonia yields 13.5 tons of ammonium sulphate.

*Example II*

The following example gives inidvidually the quantities of substances in carrying out the process according to the invention for the manufacture of 10 tons of potassium hydroxide.

For making a suitable mixture for cyanidation about 15.3 tons of potassium sulphate, 15.3 tons of coal and 13 tons of lime are used. The saponification with steam subsequent to the cyanidation of this mixture yields 10 tons of potassium hydroxide of 98% purity. In addition 2,469 kilograms of ammonia are produced on saponification. The sulphur constituent of the potassium sulphate is recovered in the form of sulphuric acid, in an amount of about 7.1 tons. The decomposition of the sulphuric acid with ammonia yields 9.6 tons of ammonium sulphate.

I claim:

1. A method of manufacturing alkali and ammonia compounds, which comprises heating an alkali sulphate in admixture with lime and carbon and in the presence of an atmosphere of nitrogen, treating the resulting material with steam to produce an alkali compound, a sulphur compound, and ammonia, converting the sulphur compound into sulphuric acid and absorbing the ammonia into the sulphuric acid to produce ammonium sulphate.

2. A method of manufacturing alkali and ammonia compounds, which comprises heating an alkali sulphate in admixture with lime and a sulphur-containing carbon fuel and in the presence of nitrogen, treating the resulting material with steam to produce an alkali compound, a sulphur compound, and ammonia, converting the sulphur compound into sulphuric acid and absorbing the ammonia into the sulphuric acid to produce ammonium sulphate.

FRIEDRICH BARTLING.